United States Patent [19]
Okumura et al.

[11] Patent Number: 5,845,686
[45] Date of Patent: Dec. 8, 1998

[54] APPARATUS FOR LOADING POWDERED OR GRANULAR MATERIAL

[75] Inventors: Akira Okumura, Yokohama; Toshiyuki Suzuki, Zama; Kazuyoshi Yoshimura, Yokohama, all of Japan

[73] Assignee: Nisshin Plant Engineering Co., Ltd., Yokohama, Japan

[21] Appl. No.: 907,592

[22] Filed: Aug. 8, 1997

[30] Foreign Application Priority Data

Feb. 14, 1997 [JP] Japan .................................. 9-030351

[51] Int. Cl.⁶ .................................................... B65G 65/28
[52] U.S. Cl. ........................... 141/256; 141/231; 141/284
[58] Field of Search ................................... 141/231, 255, 141/256, 263, 284, 286

[56] References Cited

U.S. PATENT DOCUMENTS 3,241,581  3/1966  Richardson et al. ...................... 141/284
3,738,464  6/1973  Ortlip et al. ............................. 141/284

*Primary Examiner*—Charles R. Eloshway
*Assistant Examiner*—Lynette C. Goodwin
*Attorney, Agent, or Firm*—John P. White; Cooper & Dunham LLP

[57] ABSTRACT

An apparatus for loading a powdered or granular material comprises a cylindrical chute, which is mounted in a manner to be movable in a vertical direction and through which passes the loading material, a screw type extruder for extruding the loading material from inside the chute, the extruder being mounted to a lower open end portion of the chute and capable of closing the lower open end of the chute, driving means for driving the extruder, a wire having one end fixed to the tip of the chute and having the other end fixed to a wind-up device through pulleys, and a load cell for detecting an amount of change in the thrust received by the extruder from the powdery or granular loading material. The wind-up device is operated on the basis of the value detected by the load cell.

8 Claims, 2 Drawing Sheets

APPARATUS FOR LOADING POWDERED OR GRANULAR MATERIAL

BACKGROUND OF THE INVENTION

The present invention relates to an apparatus for loading a powdered or granular material such as cement, ores, coal-ash, detergents or oil cakes, particularly, to a loading apparatus which can be suitably used for loading fine powdered or granular material onto a truck or freight car.

In general, a loading apparatus used for loading a powdered or granular material onto a truck or the like comprises a cylindrical chute arranged on the shipping section of the truck such that a powdered or granular material transferred by a conveyor belt is transferred through the chute so as to permit the transferred material to be dropped onto the truck. In this apparatus, the dropped powdered or granular material is accumulated to form a stock within which the tip portion of the chute is buried a predetermined period of time later. To overcome this difficulty, the apparatus also comprises a mechanism for successively pulling up the chute in accordance with the height of the stock.

It was customary in the past to carry out the pull-up operation of the chute based on the operator's visual observation of the stock. Since the operation relies on the visual observation, a clearance is likely to take place between the lower end of the chute and the stock, leading to serious difficulties. For example, dust generated by the dropping powdered or granular material is spread through the clearance to the outside so as to contaminate the working environment. Also, the loss of the powdered or granular material is not negligible.

A measure for overcoming these difficulties is proposed in, for example, Japanese Utility Model Disclosure (Kokai) No. 56-84510 and Japanese Utility Model Disclosure No. 57-96107. Specifically, it is ;proposed to arrange a dust-preventing sheet to surround the lower end portion of the chute. Also, it is proposed to mount a hood portion having multiple partitions in the lower end portion of the chute in Japanese Utility Model Disclosure No. 58-7711. However, the mechanisms proposed in these prior arts do not include an apparatus for vertically moving the chute. Also, the dust-preventing sheet or the hood portion tends to be turned up by a side wind or during movement of the truck under the loading operation, resulting in failure to obtain a sufficient dust-preventing effect.

Additional measures for overcoming the dust generation problem are proposed in, for example, Japanese Patent Publication (Kokoku) No. 8-11628 and Japanese Patent Publication No. 59-34610. To be more specific, the loading apparatus disclosed in JP '628 noted above comprises a balance weight (weight balancer) having the weight set to permit the lower end portion of a chute to be kept buried constantly in the stock of the dropped powdered or granular material so as to prevent a clearance from being formed between the lower end of the chute and the stock of the dropped material. The apparatus certainly produces the effect of preventing the dust from being spread to the outside of the chute because the lower end portion of the chute is kept buried in the stock of the dropped material. Also, the balance weight permits the chute itself to be moved in the vertical direction in accordance with the l height of the stock. However, it is necessary to set the weight of the balance weight appropriately in view of the thrust produced by the powdered or granular material to be loaded in the truck or the like, i.e., in view of the kind and size of the loading material. Where the loading material is a very fine powdery material such as cement, detergent or coal-ash, the thrust generated during the loading operation is very small. It is highly difficult and troublesome to control the very small thrust with a balance weight. Also, the frictional resistance of the wire rope and pulley constituting the balance weight must also be taken into account in determining the suitable weight of the balance weight. Under the circumstances, it is necessary in the apparatus disclosed in JP '628 to set the balance weight so as to permit the lower end portion of the chute to be buried deep in the stock of the dropped loading material. If operation of the loading apparatus is continued under this condition, however, the loader is buried in the stock so as to become incapable of wind-up and, thus, to bring about overloading. It follows that a trouble of the driving motor is likely to be induced so as to impair the normal operation of the loading apparatus. Particularly, where the apparatus is used for loading a fine powdery material, serious problems are brought about. Specifically, a fine powdery material has in general a high flowability. In other words, fine powdery particles have a high degree of freedom of movement, with the result that the stock formed by the forcedly discharged fine powdery material tends to be low in height and large in width. Further, the thrust itself generated when a fine powdery material is discharged onto the stock also tends to be diminished. It follows that, if the detecting sensitivity is low, an appropriate wind-up operation cannot be performed, leading to a low efficiency of the loading operation. If the detecting sensitivity is unduly increased, however, the wind-up operation is performed excessively frequently, leading to contamination of the working environment with dust.

On the other hand, JP '610 discloses an apparatus for unloading a granular solid material. The apparatus comprises a pressure sensitive means for detecting the material pressure at the outlet port of a discharge pipe. In this apparatus, the driving motor is controlled in accordance with the material pressure so as to move the end portion including the outlet port of the discharge pipe up or down. Two types of the pressure sensitive means are disclosed in this prior art. One of them is a mechanism in which the absolute value of the resistance in the step of discharging the material loaded in a chute is detected on the basis of the load of the motor for a compulsory discharge apparatus. The detected absolute value is converted into an electric signal so as to allow the chute to be pulled up on the basis of the electric signal. The pressure sensitive means of the other type includes a device consisting of a diaphragm arranged within the wall in the lower end portion of the compulsory discharge apparatus and a micro-switch arranged outside the diaphragm. The absolute value of the pressure generated by the weight or pushing force of the material loaded in the chute is detected by the pressure sensitive means so as to allow the chute to be pulled up in reply to an electric signal corresponding to the change in the detected absolute value of the pressure.

In order to use the apparatus disclosed in JP '610 for unloading a fine powdery material having a small thrust, it is necessary to increase the sensitivity of the apparatus, as already pointed out. If coarse grains are contained in the fine powdery material, the coarse grains are likely to be caught by some causes between the inner surface of the chute and the vane of an extruding screw. In this case, the catching is detected with a high sensitivity, with the result that the load of the motor is increased so as to pull up the chute. It follows that a clearance is formed between the stock and the outlet port of the chute, giving rise to a dust spreading problem. If the sensitivity is not particularly increased in unloading a fine powdery material containing coarse grains, the chute fails to be pulled up as desired, leading to a low unloading efficiency and to occurrence of a trouble of the apparatus. When it comes to the pressure sensitive means consisting of a diaphragm and a micro-switch, the increase in the sensitivity also tends to give rise to a malfunction (dust spreading) of the unloading apparatus. On the other hand, the sensitivity set as usual gives rise to a low unloading efficiency and to occurrence of a trouble of the unloading apparatus. Further, attachment of a powdery material is likely to impair the sensitivity of the apparatus.

As pointed out above, if the apparatus disclosed in any of JP '628 and JP '610 is used for handling a fine powdery material, the chute fails to be wound up appropriately, leading to a low loading efficiency. Alternatively, the chute may be wound up excessively frequently, giving rise to contamination of the working environment with dust. In conclusion, the apparatus disclosed in these prior arts leaves much room for further improvement for handling a fine powdery material.

BRIEF SUMMARY OF THE INVENTION

An object of the present invention is to provide an apparatus for loading a powdered or granular material, which is simple in structure and frees the operator from the operation of moving the chute.

Another object is to provide an apparatus for loading a powdered or granular material, which permits preventing the dust from being spread even when used for loading a fine powdery material.

According to one embodiment of the present invention, there is provided an apparatus for loading a powdered or granular material, comprising:

an apparatus body;

a cylindrical chute mounted to the apparatus body in a manner to be movable in a vertical direction and having an upper open portion through which a powdered or granular material is supplied into the chute and a lower open portion for releasing the supplied loading material from inside the chute;

means for driving the chute in a vertical direction;

means mounted within the chute for extruding downward the loading material in the chute for releasing the loading material from inside the chute, the released material being accumulated below the chute to form a stock;

means for driving the pushing means;

means for detecting an amount of change in a thrust which the extruding means has received from the stock; and means for controlling the chute driving means based on the amount detected by the detecting means.

The apparatus of the present invention can be used for loading a powdered or granular material of any particle size, and produces a prominent effect particularly when used for loading a fine powdery material having a flowability index of at least 60.

In the present invention, the loading material supplied into the chute through the upper open end thereof passes within the chute and is pushed downward to the lower portion of the chute by a extruder mounted within the chute so as to release the loading material out of the chute. The lower open portion of the chute is buried because of the weights of the chute, extruder, driving mechanism, etc. in a stock of the loading material released in advance and accumulated below the chute. It should be noted that the extruder comprises screw vanes covering the lower open portion of the chute. It follows that, if the loading material is further released onto the stock under the above-noted conditions, the dust generated by the loading material dropping within the chute stays within the chute so as to solve the problem of contamination of the working environment with dust. It should also be noted that, when the loading material is extruded from within the chute by the extruder of a screw type, a thrust (i.e., force generated by the powdery material for pushing up the extruder) is generated between the loading material supplied from the extruder and the powdery material forming the stock. Therefore, the thrust received by the extruder (or chute) from the loading material is detected by a load cell (detecting means), followed by converting the detected thrust into an electric signal, which is supplied to the control means. Further, a control signal generated from the control means is supplied to a chute driving means. It follows that the chute driving means is operated in accordance with a change in the detected value of the detecting means. Because of the particular operation, the chute is allowed to be moved upward by an appropriate distance so as to keep the lower open portion of the chute buried in the stock. To be more specific, if the buried amount of the lower open portion of the chute is increased so as to increase the thrust to reach a predetermined value, the chute driving means is operated so as to pull up the chute. As a result, the buried amount of the lower portion of the chute is decreased. Also decreased is the thrust received by the chute from the stock. When the thrust is lowered to reach a predetermined value, the chute driving means ceases to operate. If the powdered or granular material continues to be supplied into the chute under this condition, a series of operations consisting of increase in the thrust, operation of the chute driving means, pull-up of the chute, decrease in the thrust, and stopping of the chute driving means are repeated.

Alternatively, the loading apparatus of the present invention is controlled to permit the chute driving means to be operated so as to pull up the chute when the buried amount of the lower portion of the chute is increased so as to increase the thrust to reach a predetermined value. If the powdered or granular material continues to be supplied into the chute under this condition, a series of operations consisting of increase in the thrust, operation of the chute driving means, pull-up of the chute, lapse of a predetermined period of time, and stopping of the chute driving means are repeated.

As described above, the chute need not be moved separately by the operator in the loading apparatus of the present invention. Also, since the thrust received by the extruder can be measured directly, the apparatus can be controlled to be adapted for any magnitude of the thrust generated in accordance with the kind and particle size of the powdered or granular material to be loaded, with the result that a clearance is not formed between the lower open portion of the chute and the stock of the loading material. It follows that the spreading of dust to the outside of the chute can be prevented without fail. What should also be noted is that, where the loading point is changed after loading of a predetermined amount of the powdered or granular material, the operation of the extruder is stopped. In this case, the screw vane of the extruder functions as a lid serving to close the lower open end of the chute. It follows that the powdery or granular loading material within the chute does not leak to the outside. Naturally, dust is not generated during movement of the loading apparatus for changing the loading point.

In the loading apparatus of the present invention, a screw type extruder is mounted in the outlet portion of the chute in a manner to cover the inner surface of the chute. Also, the lower open portion of the chute is kept buried in the accumulated stock of the loading material. It follows that the dust generated by the dropping powdery or granular loading material can be held within the chute so as to solve the problems in respect of the loss of the loading material and contamination of the working environment with dust.

It should also be noted that, if thrust is generated by the extrusion of the loading material supplied by a screw type extruder, the value of the thrust received by the extruding means from the powdery or granular loading material is detected, and the chute is pulled up or down in accordance with the amount of change of the thrust. Since the thrust measured in the present invention is not changed abruptly, the loading apparatus of the present invention can be used effectively, even if a fine powdery material, which produces only a small thrust, is handled by the loading apparatus, while ensuring the dust preventing effect.

Further, in the apparatus of the present invention, the thrust is detected as an entire weight during movement of the apparatus including the frictional resistance of the wire rope and the pulley, making it possible to solve the problem of nonconformity taking place in an apparatus of balance weight type between the apparatus and the weight of the balance weight.

What should also be noted is that, in the apparatus of the present invention, the chute can be vertically moved by automatically controlling the thrust detecting means and chute wind-up means so as to eliminate the worker's manual operation. Further, the loading apparatus of the present invention is simple in construction. Still further, the screw of the extruder acts as a lid of the chute in the loading apparatus of the present invention. Therefore, where the loading operation is started up or where the apparatus is moved for changing the supply point of the powdery or granular loading material, the loading material within the chute does not leak to the outside of the chute, if operation of the extruder is stopped. Naturally, the dust generation problem need not be worried about.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
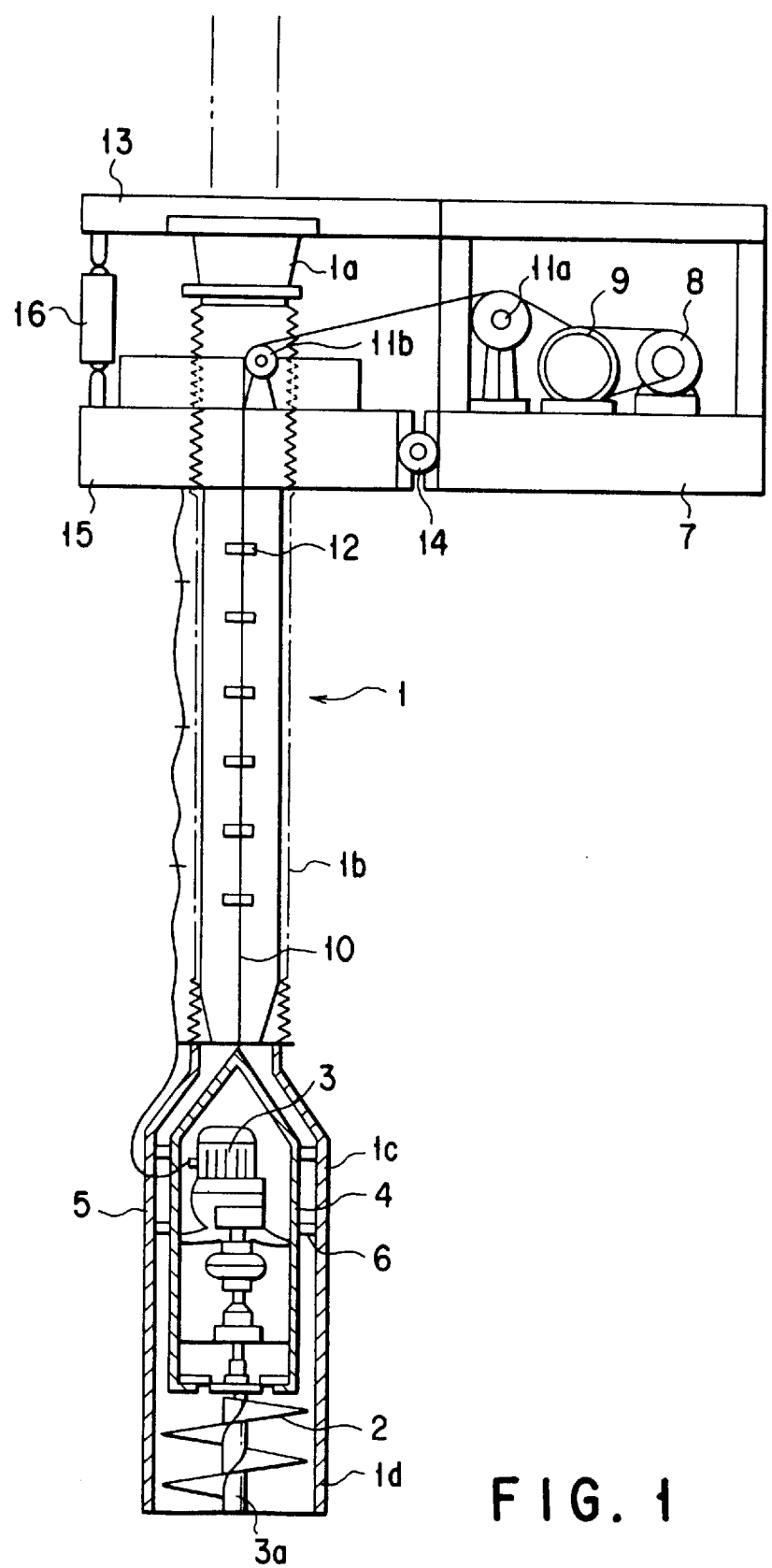
FIG. 1 shows an entire apparatus for loading a powdered or granular material according to one embodiment of the present invention.

Let us describe an apparatus for loading a powdered or granular material of the present invention with reference to the accompanying drawings. Specifically, as shown in FIG. 1, the apparatus of the present invention for loading a powdered or granular material comprises a support plate 7 arranged in an upper portion. A wind-up motor 8, a wind-up drum 9 and a pulley 11a are mounted on the support plate 7. An upper frame 13 is fixed to an upper portion of one side of the support plate 7. On the other hand, a lower frame 15 is swingably connected to a lower portion of the support plate 7 by means of a hinge unit 14 interposed between. A cylindrical chute 1 comprises first to fourth cylindrical portions 1a, 1b, 1c, 1d connected to each other to permit mutual communication. The first and fourth cylindrical portions 1a and 1d are positioned at the uppermost and lowermost portions, respectively, of the resultant chute 1. To be more specific, the first cylindrical portion 1a is mounted to the upper frame 13 such that the upper open end of the first cylindrical portion 1a faces the outlet port of a conveyer belt, denoted by two dotts-dash lines, for transferring a powdery or granular loading material. The second cylindrical portion 1b, which is mounted to the lower frame 15, is in the form of shrinkable bellows. The third cylindrical portion 1c is of an integral double wall structure consisting of an inner cylinder 4 and an outer cylinder 5. A passageway of the powdery or granular loading material is defined between the inner cylinder 4 and the outer cylinder 5. Also, a driving motor 3 for driving an extruder is arranged inside the inner cylinder 4. Further, an extruder 2 of a screw type connected to a shaft 3a of the driving motor 3 is arranged within the fourth cylindrical portion 1d. The extruder 2 is mounted such that the screw vanes thereof are nearly in contact with the inner wall of the fourth cylindrical portion 1d. Further, it is possible to mount a fin, as required, to the outer circumferential surface of the fourth cylindrical portion Id in order to prevent the chute 1 from being rotated. Incidentally, a reference numeral 6 denotes an air releasing hole communicating with both the inner cylinder 4 and the outer cylinder 5.

The chute 1 is attached to the lower frame 15 such that the chute is swingable in a vertical direction. To be more specific, a wire 10 is wound about the wind-up drum 9. The wire 10 extends through the pulleys 11a, 11b, and a wire connecting plate (wire guide) 12 arranged within the second cylindrical portion 1b such that the tip of the wire 10 is fixed to the upper end of the inner cylinder 4. It follows that, if the wind-up drum 9 is driven, the inner cylinder 4 is moved in a vertical direction. In accordance with the vertical movement of the inner cylinder 4, the bellows of the second cylindrical portion 1b is shrunk or elongated so as to cause the chute (extruder) to be moved up and down. On the other hand, a load cell 16, which serves to detect a change in the value of the thrust received by the extruder from the accumulated stock of the powdery material, is mounted between the fixed upper frame 13 and the swingable lower frame 15. To be more specific, the load cell 16 serves to detect the change in the value of the force F defined by equation (1) given below, which is generated between the loading material supplied from the extruder 2 and the loading material which was already dropped to form an accumulated stock below the extruder 2:

$$F=A+B-C \tag{1}$$

where A is the weight of the extruder, B is the weight of the loading material within the chute, and C is the thrust received by the extruder from the powdery or granular loading material.

An electric signal generated by the load cell 16 is supplied to a predetermined control circuit 20 to enable the control circuit to supply a wire wind-up signal to the wind-up motor 8.

Figure 2:
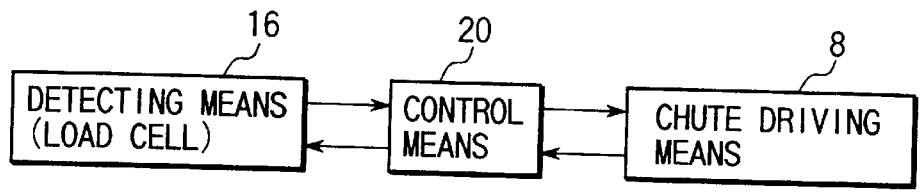
FIG. 2 is a block diagram exemplifying a control method of the present invention.
Figure 3:
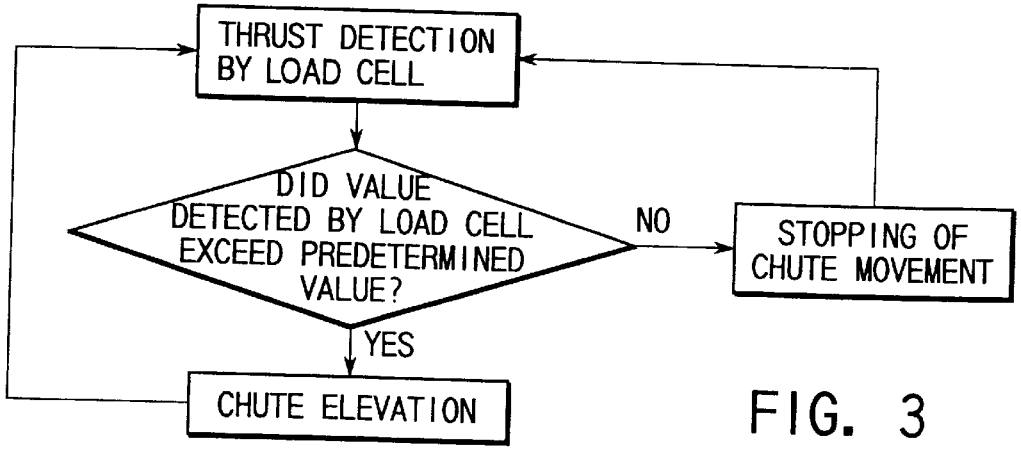
FIG. 3 is a flow chart exemplifying a control method of the present invention.

In the loading apparatus shown in the drawings, the powdery or granular loading material is dropped from the chute 1 while driving the driving motor 3. As a result, the screw type extruder 2 serves to extrude the loading material out of the loading apparatus so as to form a stock of the loading material. Also, the wind-up motor 8 is driven so as to wind or unwind the wire 10 wound about the wind-up drum 9, with the result that the inner cylinder 4 (or outer cylinder 5) connected to the wire 10 is moved upward or downward so as to adjust the distance between the upper end of the stock and the lower end of the chute. To be more specific, the load cell 16 detects a change in the thrust received by the extruder, or force F defined in equation (1). A signal denoting the above-noted change is converted into an electric signal and supplied to the control circuit (control means) 20, as shown in FIGS. 2 and 3. When the amount of the detected change reaches a predetermined upper limit, the control circuit generates a signal which permits the switch of the wind-up motor 8 to be turned on. As a result, the chute 1 is pulled up by the wind-up motor so as to permit the third cylindrical portion 1c and the fourth cylindrical portion 1d of the chute 1 to be pulled up out of the stock of the loading material. In accordance with the pulling up of the third and fourth cylindrical portions 1c, 1d, the value detected by the load cell 16 is lowered. When the detected value is lowered to reach a predetermined lower limit, the wind-up motor 8 ceases to operate.

Figure 4:
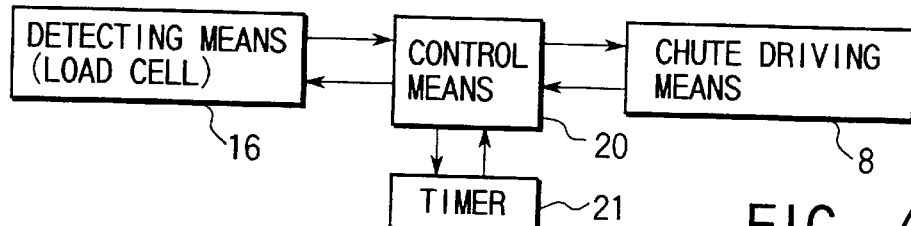
FIG. 4 is a block diagram exemplifying another control method of the present invention.
Figure 5:
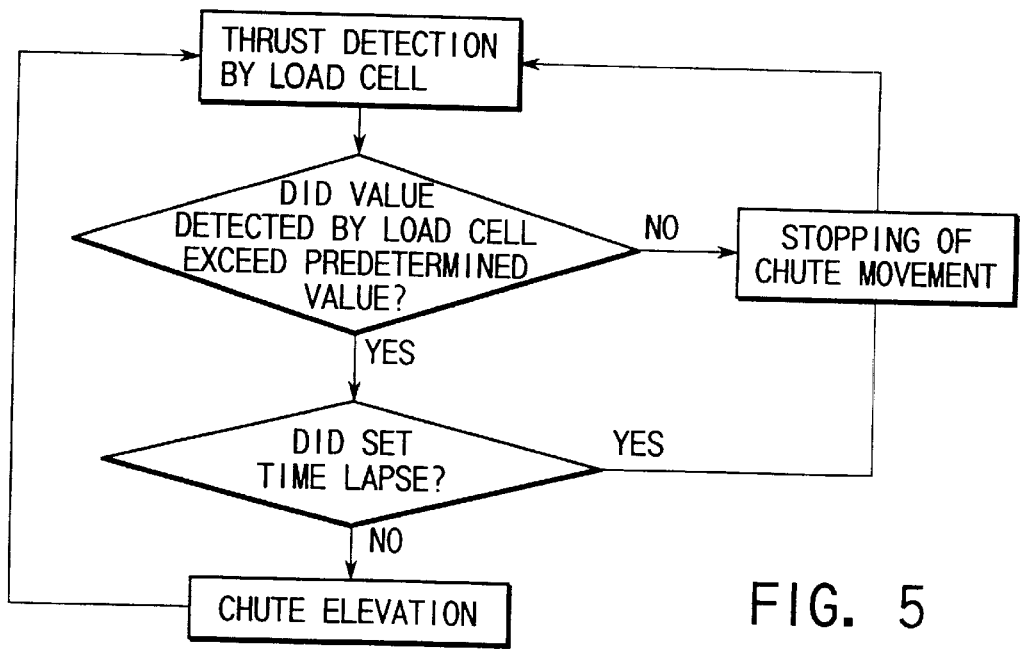
FIG. 5 is a flow chart exemplifying another control method of the present invention.

Alternatively, when the detected value exceeds the predetermined level, the switches of both the wind-up motor 8 and a timer 21 are turned on, as shown in FIGS. 4 and 5, which is detected by the timer 21 a predetermined period of time later, so as to permit the chute 1 to cease to be operated. In conclusion, the locational relationship between the upper end of the stock of the loading material and the lower end of the chute 1 is controlled on the basis of the signal detected by the load cell 16 in the loading apparatus of the present invention.

As described above, the loading apparatus of the present invention makes it possible to keep the lower end portion of the chute 1 buried in a substantially constant ratio in the stock of the powdery or granular loading material during the loading operation. It follows that the loading material can be dropped while preventing a dust from being spread out of the chute 1.

The loading apparatus of the present invention can be used for loading a powdered or granular material having an optional particle size. Particularly, when used for loading a fine powdery material which generates a small thrust, the apparatus of the present invention produces without fail the effect of preventing the dust from being spread out of the apparatus, though the difficulty was unavoidably brought about in the past.

In general, the powdered or granular material handled by the apparatus of the present invention has an average particle diameter of several millimeters or less, and includes, for example, cement, coal-ash, diatomaceous earth, titanium oxide, detergent, starch and wheat flour. It is also possible to handle suitably the powdered or granular material having at most 60 of the flowability index determined by Carr method including, for example, a coarse powder of acetate flakes having an average diameter (AD) of 1 mm and a flowability index (FA) of 63; zircon sand having a particle size of 60 to 150 meshes, a water content of 0%, and FA of 90; carbon black having FA of 68, 76 and 80 when AD is 290 $\mu$m, 520 $\mu$m and 700 $\mu$m, respectively; starch having an AD of 36 $\mu$m, a water content of 9.5%, and an FA of 62; polypropylene having FA of 92 and 83 when AD is 240 $\mu$m and 590 $\mu$m, respectively; polyvinyl alcohol having FA of 61 and 75 when AD is 300 $\mu$m and 600 $\mu$m, respectively; an ABS resin having an FA of 73 when AD is 140 $\mu$m; and polyethylene pellet having an FA of 86.5 when AD is 4 mm. Incidentally, the flowability index determined by Carr method represents a sum of the indices corresponding to the measured values in respect of the angle of repose, Compressibility, angle of spatula, alternates cohesion or uniformity coef, as described in, for example, "Carr, R. L., Evaluating Flow Properties of Solids Chem. Eng., 72, Jan. 18, 163 (1965), pp. 163–168."

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An apparatus for loading a powdered or granular material, comprising:

an apparatus body;

a cylindrical chute mounted to said apparatus body in a manner to be movable in a vertical direction and having an upper open portion through which a powdery or granular loading material is supplied into said chute and a lower open portion for releasing the loading material from inside the chute;

means for driving the chute in a vertical direction;

means mounted within the chute for extruding downward the loading material in the chute for releasing the loading material from inside the chute, the released loading material being accumulated below the chute to form a stock;

means for driving said extruding means;

means for detecting an amount of change in a thrust which said extruding means has received from the stock; and means for controlling said chute driving means based on the amount detected by said detecting means wherein said apparatus body comprises a support plate having a chute driving means mounted thereon, an upper frame fixed to said support plate, and a lower frame swingably attached to the support plate and said chute being mounted thereto.

2. The loading apparatus according to claim 1, wherein said chute comprises a first cylindrical portion having the upper open portion, a second cylindrical portion joined to said first cylindrical portion and including a shrinkable bellows portion, a third cylindrical portion of a double wall structure consisting of inner and outer cylinders arranged to form therebetween a passageway of the powdery or granular loading material, said third cylindrical portion being joined to said second cylindrical portion and driving means of said extruding means being arranged within said inner cylinder, and a fourth cylindrical portion joined to said third cylindrical portion and having the extruding means arranged therein and the lower open portion.

3. The loading apparatus according to claim 2, wherein said means for extruding downward the loading material comprises screw vanes arranged to be substantially in contact with the inner wall of the fourth cylindrical portion.

4. The loading apparatus according to claim 2, wherein said means for driving the chute comprises a motor, pulleys, and a wire having one end fixed to said inner cylinder and having the other end connected to said motor through the chute and the pulleys.

5. The loading apparatus according to claim 1, wherein said detecting means is mounted between the upper frame and the lower frame.

6. The loading apparatus according to claim 1, wherein said means for controlling the chute driving means permits the chute driving means to move the chute upward when the value detected by said detecting means exceeds a predetermined value, and permits the chute driving means to cease to operate when the detected value is lowered to reach a predetermined level.

7. The loading apparatus according to claim 1, wherein said means for controlling the chute driving means permits the chute driving means to move the chute upward when the value detected by said detecting means exceeds a predetermined value, and permits the chute driving means to cease to operate a predetermined period of time later.

8. The loading apparatus according to claim 1, which is used for handling a fine powdery loading material having a flowability index of at least 60.

* * * * *